United States Patent [19]

Nagano

[11] Patent Number: 5,412,425
[45] Date of Patent: May 2, 1995

[54] ELECTRONIC STILL CAMERA WITH POWER CONSERVATION FACILITY

[75] Inventor: Masatoshi Nagano, Tokyo, Japan

[73] Assignee: Canon Kabushiki Kaisha, Tokyo, Japan

[21] Appl. No.: 284,916

[22] Filed: Aug. 2, 1994

Related U.S. Application Data

[60] Continuation of Ser. No. 138,624, Oct. 18, 1993, abandoned, which is a continuation of Ser. No. 814,315, Apr. 10, 1992, abandoned, which is a division of Ser. No. 528,167, May 24, 1990, Pat. No. 5,122,880.

[30] Foreign Application Priority Data

| May 29, 1989 | [JP] | Japan | 1-132820 |
| May 29, 1989 | [JP] | Japan | 1-132821 |
| May 29, 1989 | [JP] | Japan | 1-132822 |
| Jun. 8, 1989 | [JP] | Japan | 1-144018 |

[51] Int. Cl.6 .......................................... H04N 5/225
[52] U.S. Cl. .................................. 348/372; 348/375; 348/333; 348/374; 358/909.1
[58] Field of Search ............... 348/730, 207, 333, 345, 348/372, 373, 375, 374; 358/909.1, 906, 190, 209, 224, 227, 909, 229; 354/219, 238.1, 266, 267.1; H04N 5/225

[56] References Cited

U.S. PATENT DOCUMENTS

| 4,404,595 | 9/1983 | Ushiro | 358/227 |
| 4,746,990 | 5/1988 | Katoh | 358/906 |
| 4,782,355 | 11/1988 | Sakai | 358/909 |
| 4,901,160 | 2/1990 | Kinoshita | 358/906 |

*Primary Examiner*—James J. Groody
*Assistant Examiner*—Sherrie Hsia
*Attorney, Agent, or Firm*—Robin, Blecker, Daley & Driscoll

[57] ABSTRACT

In an electronic still camera of the kind having a detachably mounted photo-taking optical system, an image sensor which converts into an electrical video signal an object image formed by the photo-taking optical system, a recording circuit which records the video signal and an electronic viewfinder which displays an image represented by the video signal obtained by the image sensor when the camera is in a shootable state, a confirmation member is arranged to confirm a mounted or detached state of the photo-taking optical system, and a driving-suspending and displaying-off control circuit is arranged to suspend a driving action on the image sensor and to turn off the electronic viewfinder when the detachment of the photo-taking optical system from the camera body is confirmed by the confirming member.

5 Claims, 15 Drawing Sheets

ELECTRONIC STILL CAMERA WITH POWER CONSERVATION FACILITY

This is a continuation application under 37 CRF 1.62 of prior application Ser. No. 08/138,624, filed Oct. 18, 1993 (abandoned), which is a cont. of Ser. No. 07/814,315, filed Apr. 10, 1992, (aban.) which is a division of Ser. No. 07/528,167, filed May 24, 1990 (now U.S. Pat. No. 5,122,880).

BACKGROUND OF THE INVENTION

1. Field of the Invention

This invention relates to an electronic still camera and more particularly to a camera of the kind arranged to record, on a recording medium, images obtained by image sensing means such as a solid-state image sensor.

2. Description of the Related Art

An electronic still camera has recently been developed. The electronic still camera comprises in combination a solid-state image sensor such as a CCD and a recorder using a rotary recording medium such as a magnetic disc. The camera is arranged to record a still image on the rotary recording medium and to reproduce the recorded image using a monitor or a printer.

Unlike the camera of the kind using a silver-halide film (hereinafter referred to as a silver-halide camera), the electronic still camera obviates the necessity of chemical processes such as a developing process, etc. An image obtained by the image sensor is instantly observable on a monitor or as a hard copy. It is not necessary to shield the recording medium from light. Further, the recording medium is reusable. The electronic still camera thus has many advantages. It is another advantage of the electronic still camera that the camera of this kind permits use of an electronic viewfinder. The use of the electronic viewfinder obviates the necessity of having a quick return mirror, etc., arranged between a photo-taking optical system and the image sensor. Besides, the camera of this kind is free from the following problems of the silver-halide camera of the kind having a viewfinder optical system separately from the photo-taking optical system: There arises a difference in parallax between the two optical systems. In a case where the photo-taking optical system is a zoom lens, it necessitates a complex interlocking mechanism between the two optical systems.

However, a disadvantage of the electronic viewfinder of the conventional electronic still camera lies in that, unlike the optical viewfinder, it consumes a large amount of electric energy. Therefore, the conventional electronic still camera using the electronic viewfinder has greatly shortened the life of a power source because of the large electric energy consumption by the electronic viewfinder.

SUMMARY OF THE INVENTION

This invention is directed to the solution of the above-stated problem. It is, therefore, a first object of the invention to provide an electronic still camera which is arranged to prevent any unnecessary consumption of electric energy by stopping a driving action on image sensing means and by turning off an electronic viewfinder in a case where the photo-taking optical system is detached from a camera body, thus requiring no displaying by the electronic viewfinder, while the camera is in a shootable state.

It is a second object of the invention to provide an electronic still camera which is arranged to turn off an electronic viewfinder during a period between the start and end of a self-timer shooting operation for the purpose of preventing the camera from unnecessarily consuming the power source thereof.

It is a third object of the invention to provide an electronic still camera which is arranged to prevent an unnecessary consumption of the power source of the camera by suspending a driving action on image sensing means and by turning off an electronic viewfinder during the period of an interval shooting mode except when shooting and recording actions are performed.

It is a fourth object of the invention to provide an electronic still camera which is arranged to prevent an unnecessary consumption of the power source of the camera by suspending a driving action on image sensing means and by turning off an electronic viewfinder during the period of a remote-control shooting mode except when shooting and recording actions are performed.

To attain this object, an electronic still camera of the kind having a detachably mounted photo-taking optical system, image sensing means for converting into an electrical video signal an object image formed by the photo-taking optical system, recording means for recording the video signal and an electronic viewfinder for displaying an image represented by the video signal obtained by the image sensing means at the time of a shootable state of the camera is arranged according to this invention as an embodiment thereof to comprise: confirming means for confirming a detached state or mounted state of the photo-taking optical system; and driving-suspending and displaying-off control means arranged to suspend a driving action on the image sensing means and to turn off the electronic viewfinder when the confirming means confirms that the photo-taking optical system is detached from the camera at the time of a shootable state of the camera.

The embodiment which attains the above-stated object is arranged to turn on the electronic viewfinder again when the photo-taking optical system is mounted again on the camera body after the electronic viewfinder is turned off with the photo-taking optical system detached from the camera body at the time of a shootable state of the camera, so that the image represented by the video signal obtained by the image sensing means can be displayed.

The above-stated electronic still camera arranged according to this invention confirms by the confirming means a mounted or detached state of the photo-taking optical system on or from the camera body; and suspends a driving action on the image sensing means and turns off the electronic viewfinder by the driving-suspending and displaying-off control means upon confirmation of the detached state of the optical system from the camera body at the time of a shootable state of the camera. Further, with the electronic viewfinder remaining turned off while the photo-taking optical system is dismounted, when the optical system is again mounted on the camera body at the time of a shootable state, the electronic viewfinder comes to be turned on again to display the image represented by the video signal obtained by the image sensing means.

Further, to attain the above-stated object, an electronic still camera having a photo-taking optical system, image sensing means for converting into an electrical video signal an object image formed by the photo-taking optical system, recording means for recording the video signal, an electronic viewfinder for displaying an image represented by the video signal obtained by the image sensing means at the time of a shootable state of the camera and self-timer shooting means having a self-timer shooting function is arranged according to this invention as an embodiment thereof to include: displaying-off control means for turning off the electronic viewfinder when a self-timer shooting action begins with the camera set in a self-timer shooting mode.

In the embodiment, the displaying-off control means turns on the electronic viewfinder again to display an image represented by the video signal obtained by the image sensing means after completion of the self-timer shooting action. With the electronic still camera provided with the displaying-off control means, the electronic viewfinder is turned off when the self-timer shooting action begins with the camera set in the self-timer shooting mode by the self-timer shooting function of the self-timer shooting means. Further, the displaying-off control means of the electronic still camera is arranged to again turn on the electronic viewfinder upon completion of the self-timer shooting action to display the image represented by the video signal obtained by the image sensing means.

Further to attain the above-stated object, an electronic still camera having a photo-taking optical system, image sensing means for converting into an electrical video signal an object image formed by the photo-taking optical system, recording means for recording the video signal and an electronic viewfinder for displaying an image represented by the video signal formed by the image sensing means is arranged as an embodiment of this invention to comprise: interval shooting means for automatically performing a shooting action at intervals of a given period of time and for a number of pictures designated from the outside; and driving-suspending and displaying-off control means arranged to suspend a driving action on the image sensing means and to turn off the electronic viewfinder at the time other than the time of shooting and recording actions after commencement of interval shooting with the camera set in an interval shooting mode.

The above-stated electronic still camera is arranged to be set by the interval shooting means into an interval shooting mode in which interval shooting is performed for a number of pictures and at intervals of time designated from the outside; and, after commencement of the interval shooting, to suspend the image sensor driving action and to turn off the electronic viewfinder by the driving-suspending and displaying-off control means except for photo-taking and recording actions.

Further to attain the above-stated object, an electronic still camera having a photo-taking optical system, image sensing means for converting into an electrical video signal an object image formed by the photo-taking optical system, recording means for recording the video signal, an electronic viewfinder for displaying an image represented by the video signal obtained by the image sensing means at the time of a shootable state of the camera and a remote-control shooting function is arranged as an embodiment of the invention to comprise: remote-control mode setting means for setting the camera into a remote-control shooting mode; and driving-suspending and displaying-off control means arranged to suspend a driving action on the image sensing means and to turn off the electronic viewfinder when the camera is set in the remote-control shooting mode.

In the arrangement described above, the remote-control mode setting means includes a remote-control operation member which is engageable with the camera body and engagement confirming means for confirming that the remote-control operation member is engaged with the camera body. The camera is brought into the remote-control shooting mode by the remote-control mode setting means when the engagement confirming means confirms that the remote-control operation member is detached from the camera body at the time of a shootable state of the camera.

Further, in the above-stated arrangement, the remote-control mode setting means is allowed to set the camera into the remote-control shooting mode by means of a remote-control shooting mode setting switch when the camera is in a shootable state. The above-stated object is attained with the remote-control member arranged discretely from the camera body for remote-control shooting.

With the electronic still camera arranged as described above, the camera is set into the remote-control shooting mode by the remote-control mode setting means. With the camera set in the remote-control shooting mode, the driving-suspending and displaying-off control means suspends the driving action on the image sensing means and turns off the electronic viewfinder in the remote-control shooting mode except when shooting and recording actions are performed.

The remote-control mode setting means of the electronic still camera according to this invention is arranged to set the camera in the remote-control shooting mode only after confirmation by the engagement confirming means of the fact that the remote-control operation member is detached from the camera body. Further, the remote-control mode setting means is arranged to set the camera in the remote-control shooting mode when the camera is in a shootable state. After that, remote-control shooting can be performed by means of the remote-control operation member which is arranged discretely from the camera body.

These and further objects and features of the invention will become apparent from the following detailed description of embodiments thereof taken in connection with the accompanying drawings.

10(b) showing the remote-control operation member of the still camera.

Figure 11:
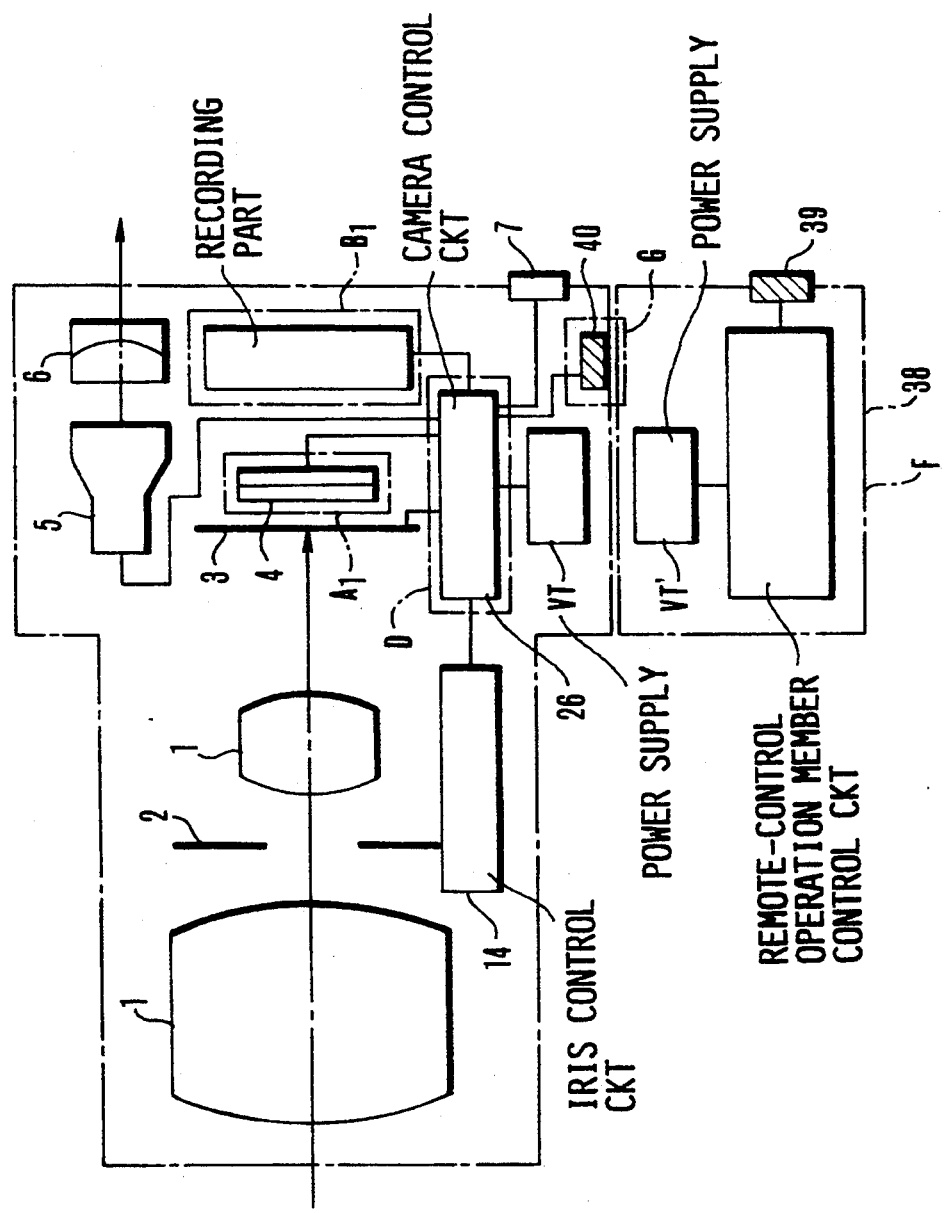
Figure 12:
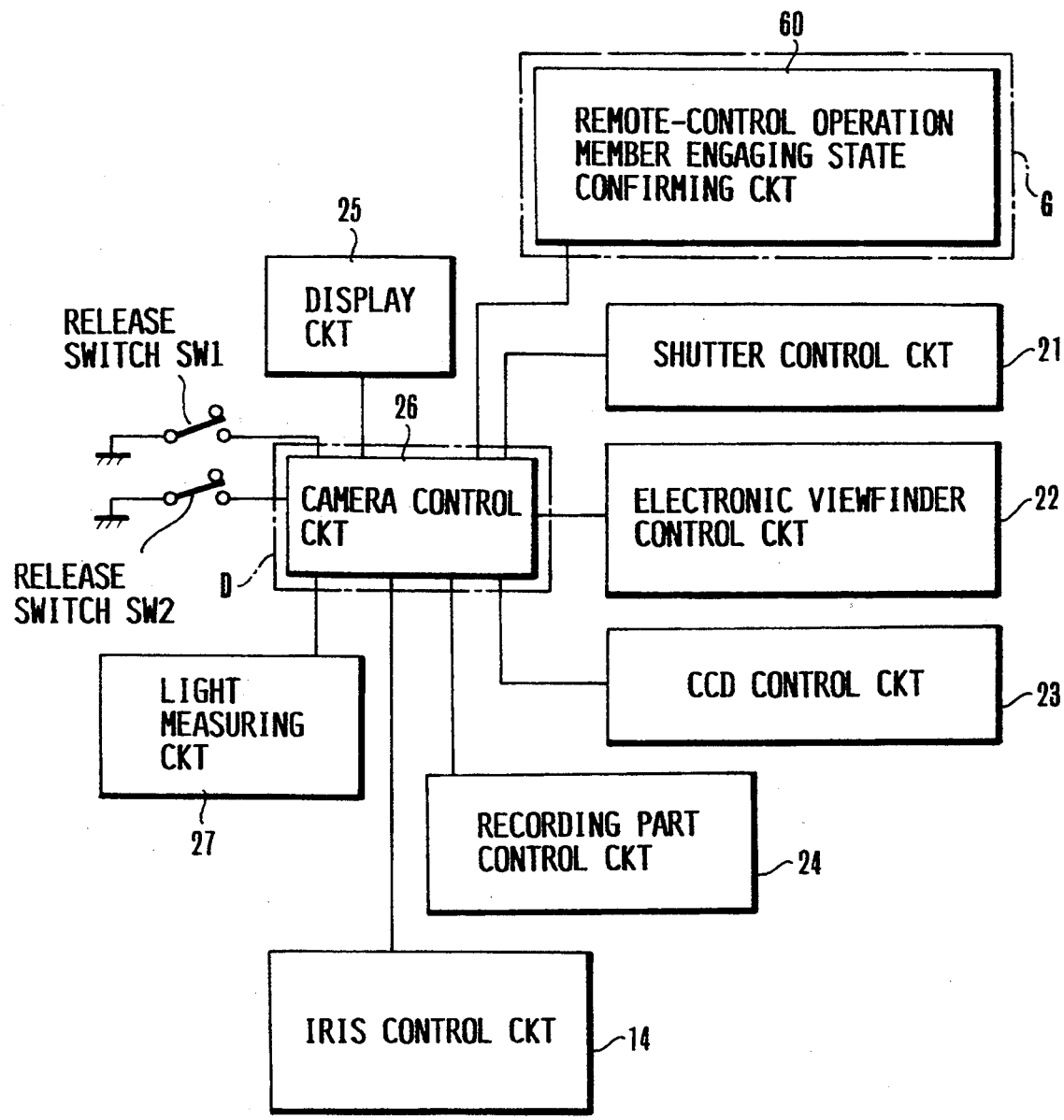
Figure 13A:
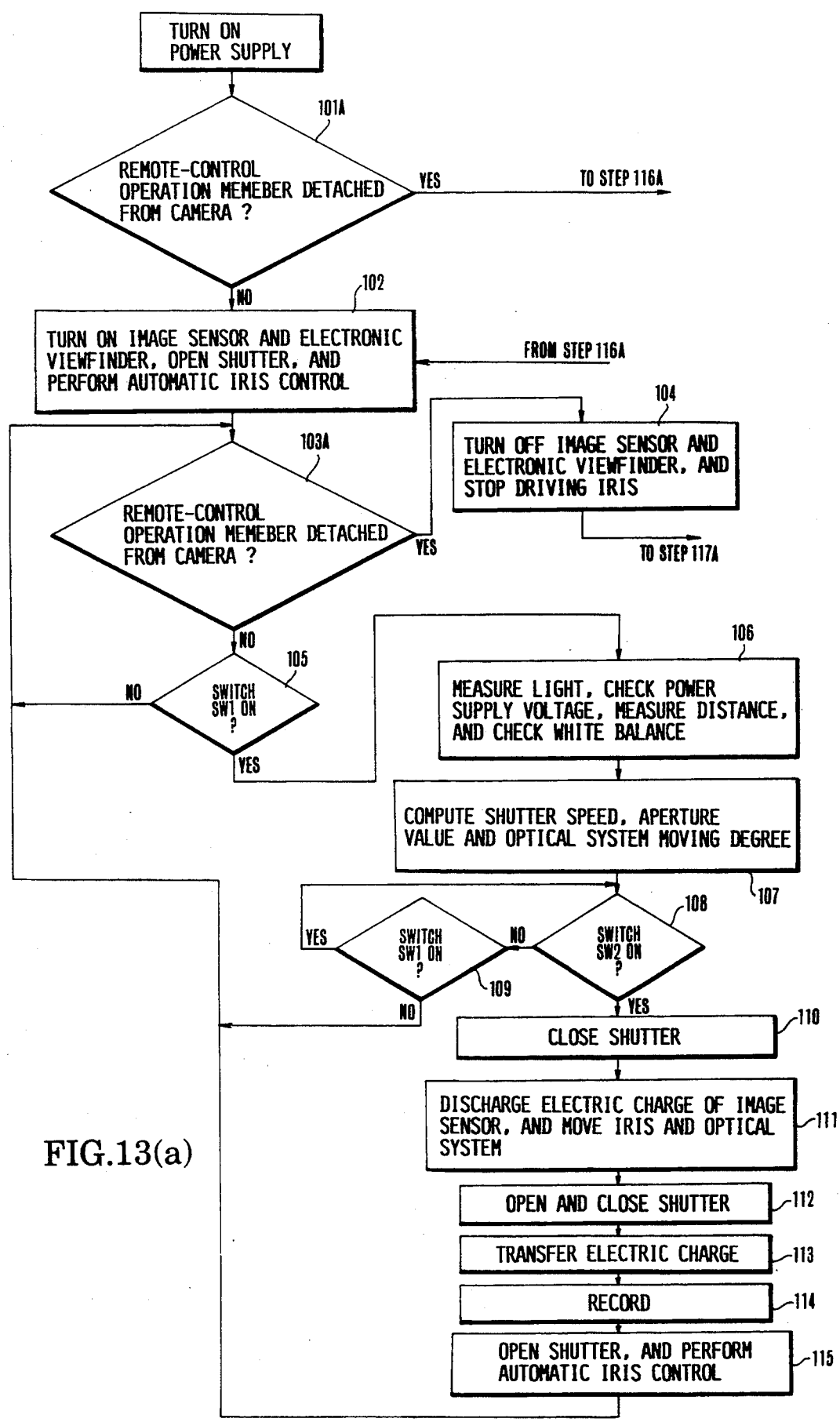
Figure 13B:
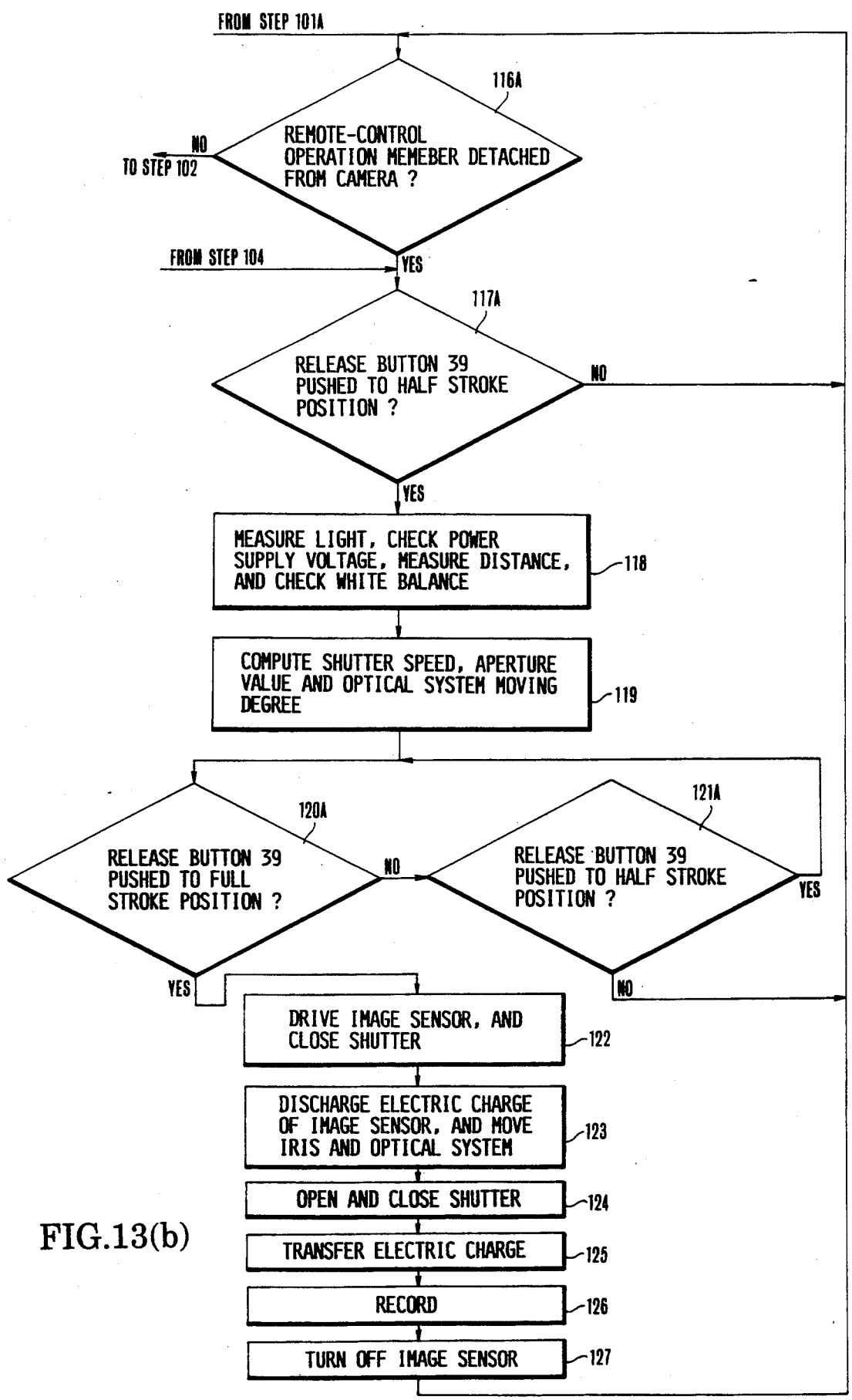

FIG. 11 is a schematic illustration of an electronic still camera which is arranged as a fifth embodiment of the invention. FIG. 12 is a block diagram showing the circuit arrangement of the fifth embodiment. FIGS. 13(a) and 13(b) are flow charts showing the flow of control over the operation of the fifth embodiment.

DETAILED DESCRIPTION OF PREFERRED EMBODIMENTS

Figure 1:
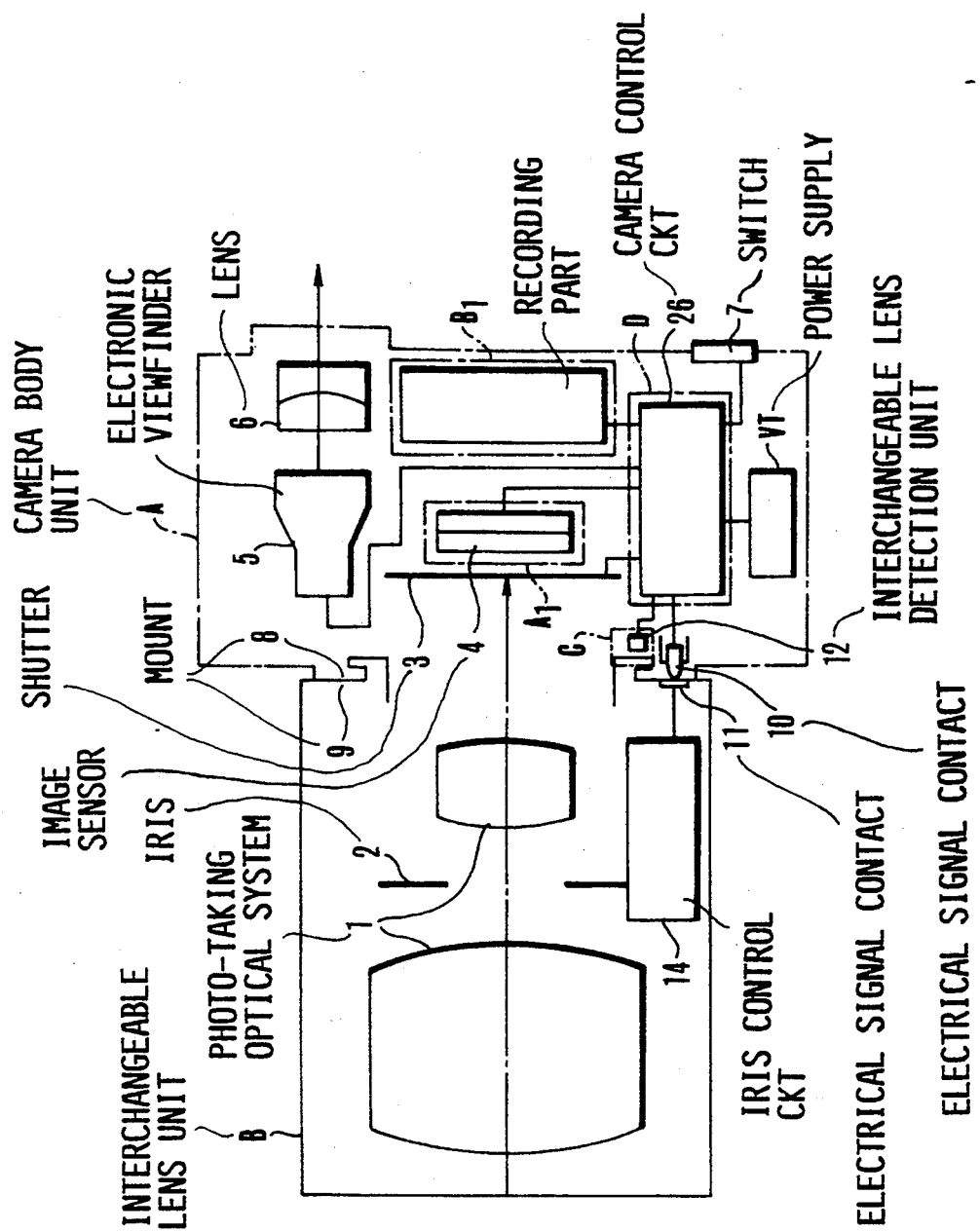
FIG. 1 is a schematic illustration showing in outline the arrangement of an electronic still camera arranged as a first embodiment of this invention.
Figure 2:
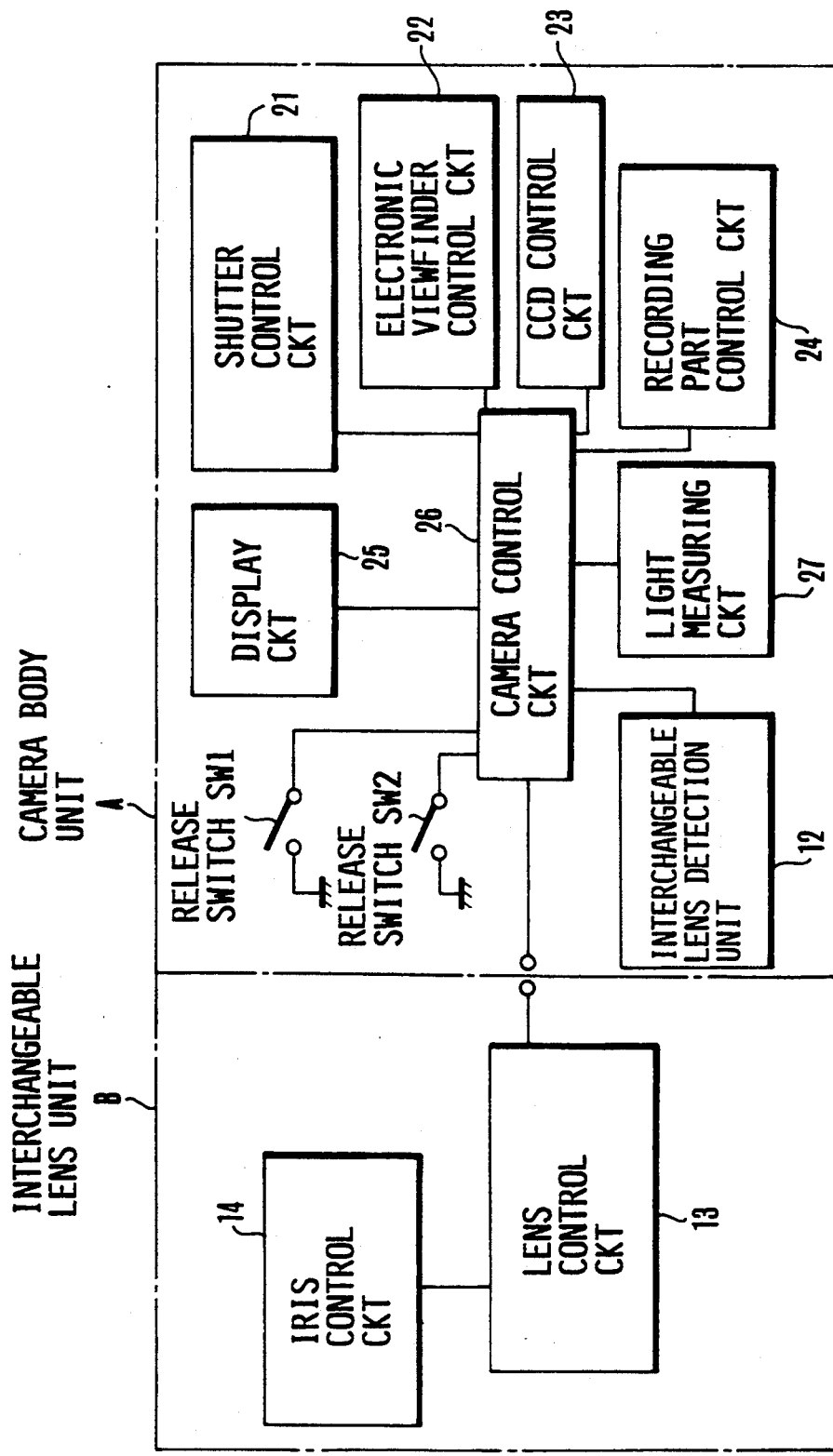
FIG. 2 is a block diagram showing the arrangement of the first embodiment.

Preferred embodiments of this invention are described below with reference to the accompanying drawings:

Referring to FIGS. 1 and 2, image sensing means A1 is composed of an image sensor 4 and is arranged to convert into an electrical video signal an object image which is formed by a photo-taking optical system 1. Recording means B1 is composed of a recording part and is arranged to record the above-stated video signal. Confirming means C is composed of an interchangeable lens detection unit 12 and is arranged to confirm a mounted or detached state of the photo-taking optical system 1. Driving-suspending and displaying-off control means D is composed of a camera control circuit 26 and is arranged to cause a driving action on the image sensing means A1 to be suspended and an electronic viewfinder 5 to be turned off when it is confirmed by the confirming means C that the optical system 1 is detached from the camera body. The illustration includes a camera body unit A; an interchangeable lens unit B; an iris 2 which is controlled by an iris control circuit 14; a shutter 3 which is controlled by a shutter control circuit 21 (FIG. 2); an electronic viewfinder 5; a lens 6 of the viewfinder part; a switch 7 which serves as a power supply switch and also as a mode selection switch; a mount 8 which is disposed on the side of the camera body unit A; a mount 9 which is disposed on the side of the interchangeable lens unit B; an electrical signal contact 10 which is carried by the mount 8 of the camera body unit A; and another electrical signal contact 11 which is carried by the mount 9 of the interchangeable lens unit B.

The first embodiment which is arranged in the above-stated manner operates as described below with reference to FIGS. 1 and 2:

The camera becomes operable when the power supply is switched on with the switch 7 operated. Then, the interchangeable lens detection unit 12 makes a check to find if an interchangeable lens is mounted on the camera body. If not, the electronic viewfinder 5 is not turned on. If an interchangeable lens is found by the interchangeable lens detection unit 12 to have been mounted on the camera body, the image sensor 4 is driven, the electronic viewfinder 5 is turned on, and the viewfinder 5 displays an image formed on the image sensor 4 by the photo-taking optical system 1. At this moment, the shutter 3 is in an open state. The iris 2 is opened and closed according to the electric charge which is accumulated by the image sensor 4, i.e., the quantity of light incident upon the image sensor 4. The aperture of the iris 2 is thus adjusted to have a given quantity of light incident upon the image sensor 4. The photographer pushes a (shutter) release button (not shown) after composing a picture through the electronic viewfinder 5. Then, when the release button is pushed to its half stroke position, a switch SW1 (FIG. 2) is turned on to allow a light measuring unit which is not shown to measure the luminance of an object to be shot. After that, a switch SW2 (FIG. 2) is turned on when the release button is further pushed. A shooting action begins when the on-state of the switch SW2 is confirmed by the camera control circuit 26. The aperture position of the iris 2 is first shifted to its position corresponding to an aperture value which is either set according to the luminance of the object or set beforehand by the photographer. At the same time, the shutter 3 is closed and the electric charge accumulated by the image sensor 4 is discharged. A video signal which is thus obtained at the image sensor 4 by operating the shutter 3 is then transferred by the camera control circuit 26 to the recording part. The video signal is recorded by the recording part control circuit 24 on an unrecorded part of the recording medium. Then shutter 3 is brought back to its state obtained before the shutter release, and the shooting operation comes to an end.

When the camera is in a shootable state with the interchangeable lens mounted and the power supply of the camera switched on, the image sensor 4 is driven and the electronic viewfinder 5 is turned on. Under this condition, when the interchangeable lens is detached from the camera body for the purpose of replacing it with another lens, the interchangeable lens detection unit 12 detects the absence of the interchangeable lens from its position on the camera body. Upon detection of this, the driving action on the image sensor 4 comes to a stop and the electronic viewfinder 5 is turned off. After that, when the interchangeable lens detection unit 12 comes to detect that an interchangeable lens is mounted again on the camera body, the electronic viewfinder 5 is turned on to display an image formed at the image sensor 4.

Further, when none of camera operation members such as the release button, etc., have been operated over a certain given period of time, the image sensor 4 ceases to be driven and the electronic viewfinder 5 is turned off to prevent electric energy from being wasted. However, when a camera operation member is operated under this condition, the image sensor 4 is driven and the electronic viewfinder 5 is again turned on.

Figure 3:
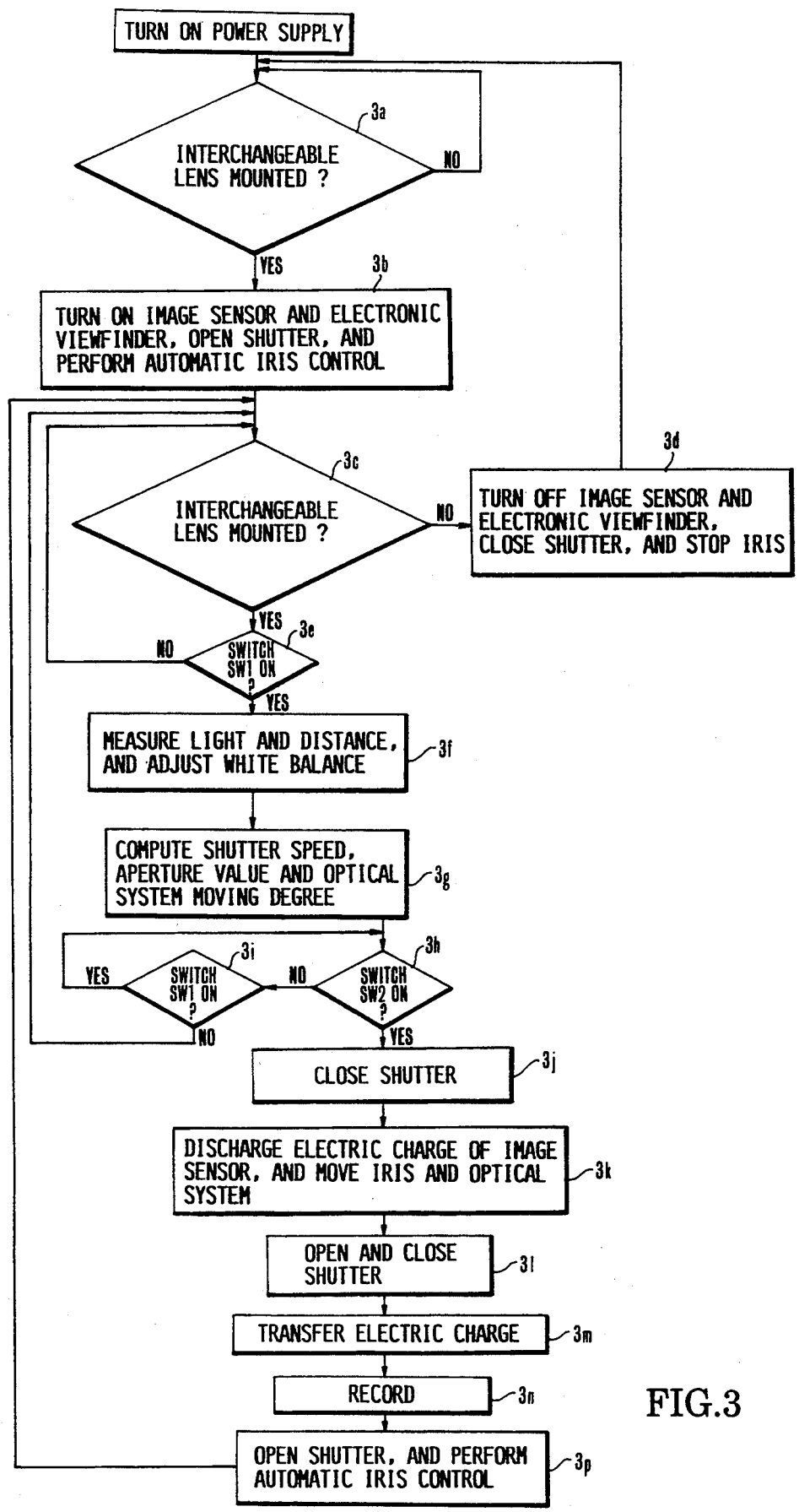
FIG. 3 is a flow chart showing the flow of control over the operation of the first embodiment.

Next, the following describes control over the operation of the first embodiment with reference to FIG. 3 which is a flow chart. Referring to FIG. 3, the flow of operation begins with the power supply switched on. Then, at a step 3a, a check is made to see if the interchangeable lens is mounted on the camera body. If so, the flow proceeds to a step 3b. At the step 3b: The image sensor is driven and the electronic viewfinder is turned on. The shutter is opened, and automatic iris control is performed. If no interchangeable lens is found to be mounted on the camera body at the step 3a, the flow comes back to the start of the step 3a. At a step 3c: A check is made again for the mounted state of the interchangeable lens. If the lens is found to be mounted, the flow comes to a step 3e. If not, the flow comes to a step 3d. At the step 3d: The driving action on the image sensor and the electronic viewfinder are turned off. The shutter is closed. A driving action on the iris comes to a stop. At the step 3e: A check is made to see if the switch SW1 is pushed. If so, the flow proceeds to a step 3f. If not, the flow comes back to the step 3c. At the step 3f: Light and distance measuring actions and white balance adjustment are performed and the flow proceeds to a step 3g. At the step 3g: A computing operation is performed to obtain a shutter speed, an aperture value and a degree to which the optical system is to be moved.

The flow then proceeds to a step 3h. At the step 3h: A check is made to see if the switch SW2 is turned on. If so, the flow comes to a step 3j. If not, the flow comes to a step 3i. At the step 3i: A check is made to see if the switch SW1 is on. If so, the flow comes back to the step 3h. If not, the flow comes back to the step 3c. At the step 3j: The shutter is closed and the flow comes to a step 3k. At the step 3k: The electric charge of the image sensor is discharged. The position of the iris and that of the optical system are adjusted, and the flow comes to a step 3l. At the step 3l: The shutter is opened and closed. At a step 3m: The electric charge is transferred. At a step 3n: Recording is performed. At a step 3p: The shutter is opened. Automatic iris control is performed. A round of shooting processes comes to an end. The flow then comes back to the step 3c to repeat the same steps.

As described above, the first embodiment of this invention is arranged to suspend the driving action on the image sensor and to turn off the electronic viewfinder to save the power source from being unnecessarily consumed when the use of the electronic viewfinder is not required with the photo-taking optical system detached from the camera body while the camera is in a shootable state.

Figure 4:
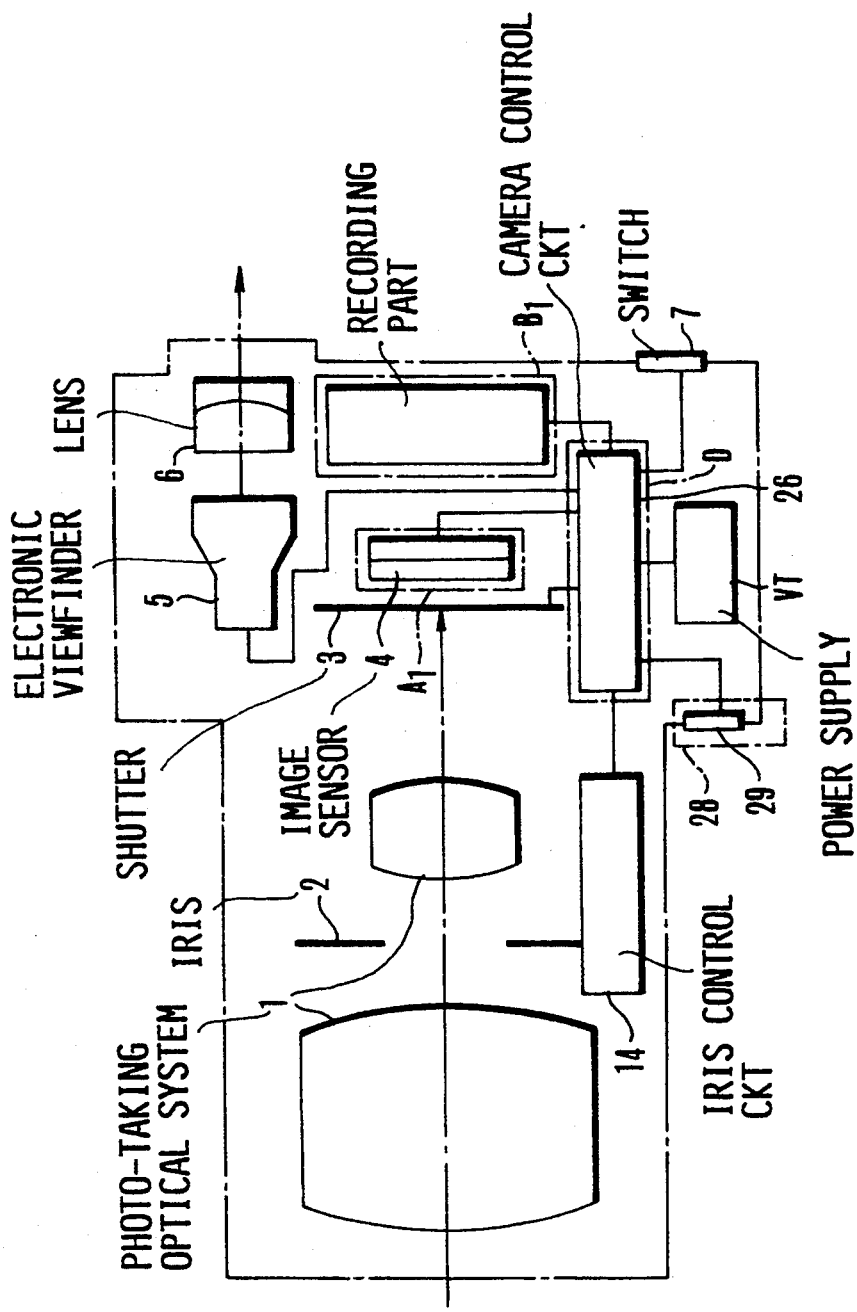
FIG. 4 is a schematic illustration of the arrangement of an electronic still camera arranged as a second embodiment of the invention.
Figure 5:
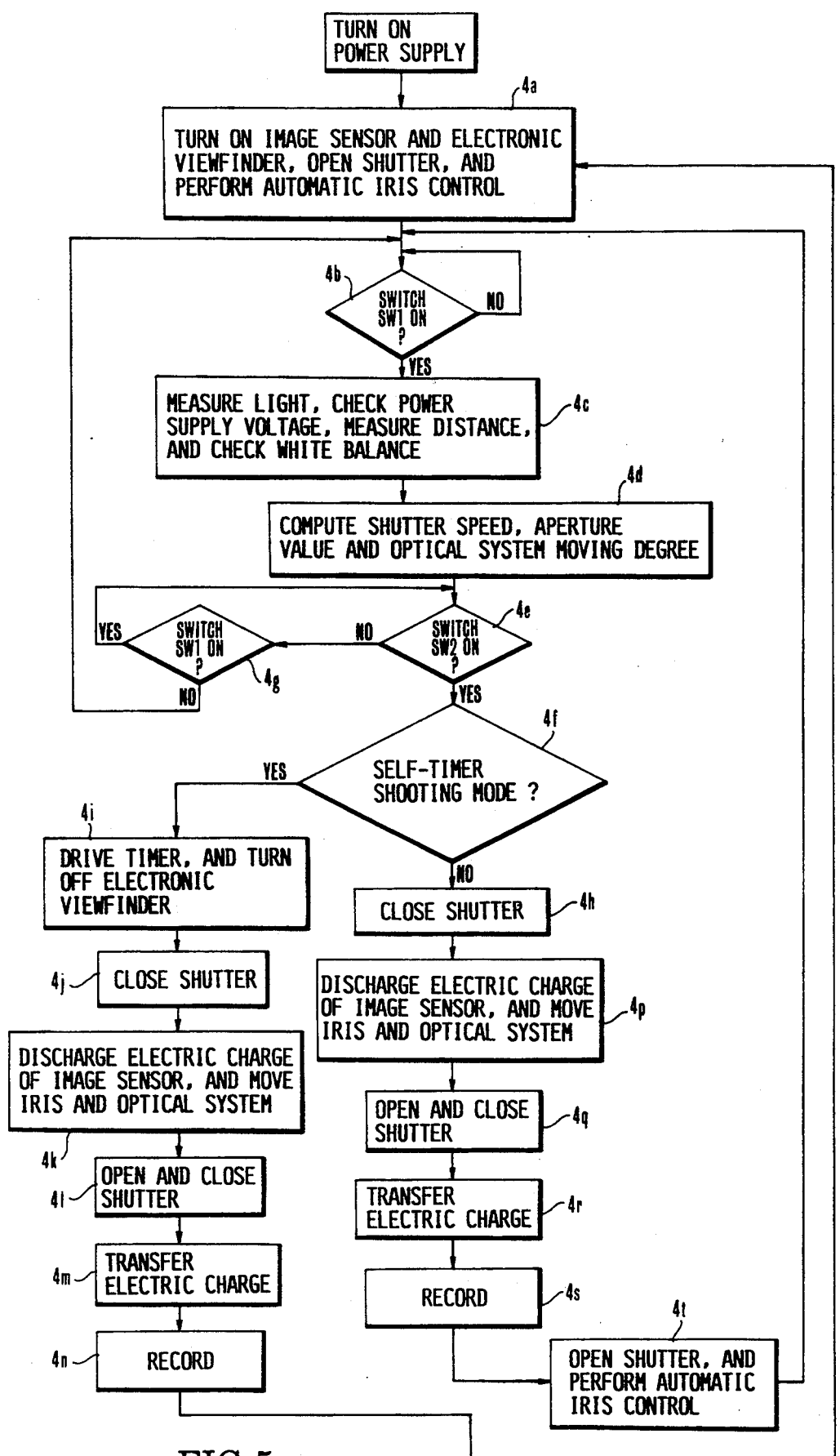
FIG. 5 is a flow chart showing the flow of control over the operation of the second embodiment.

FIG. 4 shows in outline the arrangement of an electronic still camera which is arranged according to this invention as a second embodiment thereof. FIG. 5 is a flow chart showing control procedures for the operation of the second embodiment.

In FIG. 4, the same component parts as those of the first embodiment shown in FIGS. 1 to 3 are indicated by the same reference numerals. Referring to FIG. 4, self-timer shooting means 28 is composed of a self-timer 29 and is arranged to permit self-timer shooting. When self-timer shooting begins with the camera set in a self-timer shooting mode, the camera control circuit 26 turns off the electronic viewfinder.

The flow of operation control procedures of the second embodiment is described below with emphasis placed on the displaying-off control of the viewfinder:

The flow of operation control begins when the power supply of the camera is switched on. At a step 4a (FIG. 5) of the flow: Both the image sensor and the electronic viewfinder are turned on. An image is displayed at the viewfinder. The shutter is opened. An automatic iris control action is performed. The flow then proceeds to a step 4b. At the step 4b: A check is made to see if the switch SW1 has been pushed. If so, the flow comes to a step 4c. If not, the flow comes back to the start point of the step 4b. At the step 4c: Light and distance measuring actions are performed. A check is made for power supply voltage and for white balance. At a step 4d: A computing operation is performed for a shutter speed, an aperture value and an optical system moving degree. At a step 4e: A check is made to see if the switch SW2 has been pushed. If so, the flow proceeds to a step 4f. If not, the flow comes to a step 4g. At the step 4g: A check is made to see if the switch SW1 is on. If so, the flow comes back to a step 4e. If not, the flow comes back to the step 4b. At the step 4f: A check is made to see if the shooting mode is the self-timer shooting mode (hereinafter referred to as self-timer mode). If the mode is found to be a normal mode and is not the self-timer mode, the flow comes to a step 4h. At the step 4h: The shutter is closed and the flow comes to a step 4p. At the step 4p: The electric charge accumulated at the image sensor is discharged. The position of the iris and that of the optical system are moved. At a step 4q: The shutter is opened and closed. At a step 4r: The electric charge of the image sensor is transferred. At a step 4s: Recording is performed and the flow proceeds to a step 4t. At the step 4t: The shutter is opened and the automatic iris control is performed. The flow then comes back to the step 4b.

Meanwhile, if the mode is found to be the self-timer mode at the step 4f, the flow comes to a step 4i. At the step 4i: A timer is driven. The electronic viewfinder is turned off. At a step 4j: The shutter is closed. At a step 4k: The electric charge of the image sensor is discharged. The position of the iris and that of the optical system are moved. The flow proceeds to a step 4l. At the step 4l: The shutter is opened and closed. At a step 4m: The electric charge is transferred. At a step 4n: Recording is performed and the flow comes back to the step 4a.

The second embodiment described above is capable of preventing the power source from being unnecessarily consumed because the electronic viewfinder is turned off during a period of time from the start to the end of the self-timer shooting mode.

Figure 6:
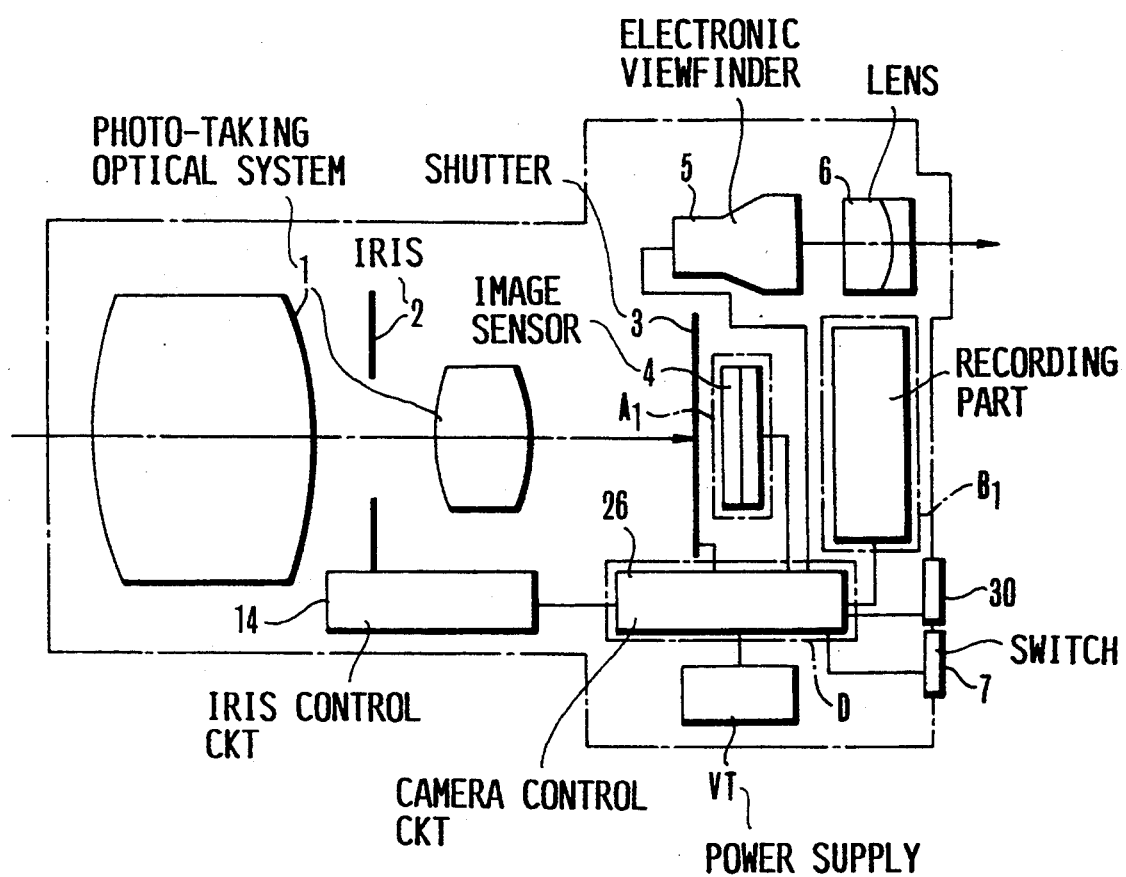
FIG. 6 is a schematic illustration of the arrangement of an electronic still camera arranged as a third embodiment of the invention.
Figure 7:
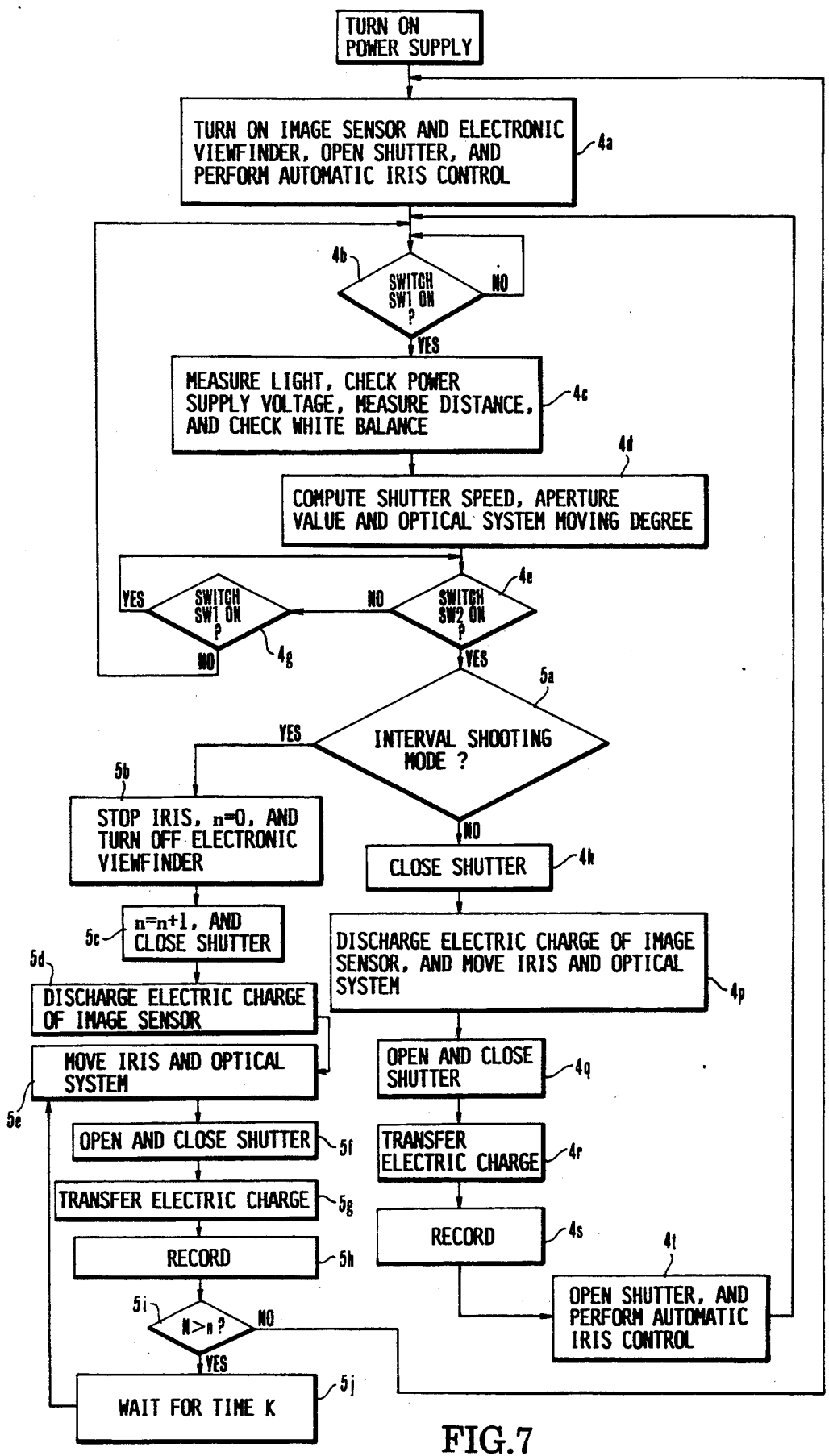
FIG. 7 is a flow chart showing the flow of control over the operation of the third embodiment.

FIG. 6 shows in outline the arrangement of an electronic still camera which is arranged as a third embodiment of the invention. FIG. 7 is a flow chart showing the flow of control over the operation of the third embodiment. In FIGS. 6 and 7, the same parts as those of FIGS. 1 to 5 are indicated by the same reference numerals.

Referring to FIG. 6, a camera control circuit 26 is arranged to cause interval shooting to be automatically performed for a number of pictures and at intervals of a given period of time designated from the outside; and to suspend a driving action on the image sensor 4 and to turn off the electronic viewfinder 5, except when shooting and recording are performed, after commencement of an interval shooting operation with the camera having been set in an interval shooting mode.

More specifically, in carrying out the interval shooting operation, the photographer shifts the position of a switch 30 to select the interval shooting mode. The photographer also sets the interval time (time K) and the number of pictures (N) to be shot; and then determines the picture composition in the same manner as in the case of the normal shooting. (The picture composition may be determined before the setting of the interval shooting mode.) After commencement of the interval shooting mode, the image sensor driving action is suspended and the electronic viewfinder is turned off except when shooting and recording actions are performed. The shooting process of the camera, from the light measuring action to the recording action, is performed in the same manner as in the case of the normal shooting operation.

The following describes the operation control flow of the third embodiment with reference to the flow chart of FIG. 7 and with emphasis placed on the driving-suspending and displaying-off control means: In FIG. 7, the same steps as those of FIG. 5 are indicated by the same step numbers. At a step 5a of FIG. 7, a check is made to see if the shooting mode is the interval shooting mode. If it is found to be a normal shooting mode and is not the interval shooting mode, the flow proceeds to a step 4h and subsequent steps. If the shooting mode is the interval shooting mode, the flow proceeds to a step 5b. At the step 5b: A driving action on the iris is stopped. A shot count number "n" is set at "0". The electronic viewfinder 5 is turned off. The flow proceeds to a step 5c. At the step 5c: The shot count number "n" is set at "n+1" (incremented by one). The shutter 3 is closed. At a step 5d: The electric charge of the image sensor 4 is discharged. At a step 5e: The position of the iris and that of the optical system 1 are moved. At a step 5f: The shutter is operated. At a step 5g: The electric charge is transferred. At a step 5h: The recording action is performed. Step 5i: A check is made to see if the shot count number "n" is less than a set number of shots N. If so, the flow comes to a step 5j. At the step 5j: The flow waits for a set interval period of time K. After the end of the waiting time, the flow comes back to the step 5e to repeat the above-stated steps until the shot count number "n" is no longer less then the set interval time N. After that, the flow comes back to the step 4a.

The third embodiment is arranged, as described above, to suspend the driving action on the image sensing means and to turn off the electronic viewfinder when the shooting and recording actions are not performed during the process of interval shooting. This saves the power source of the camera from being wasted.

Figure 8:
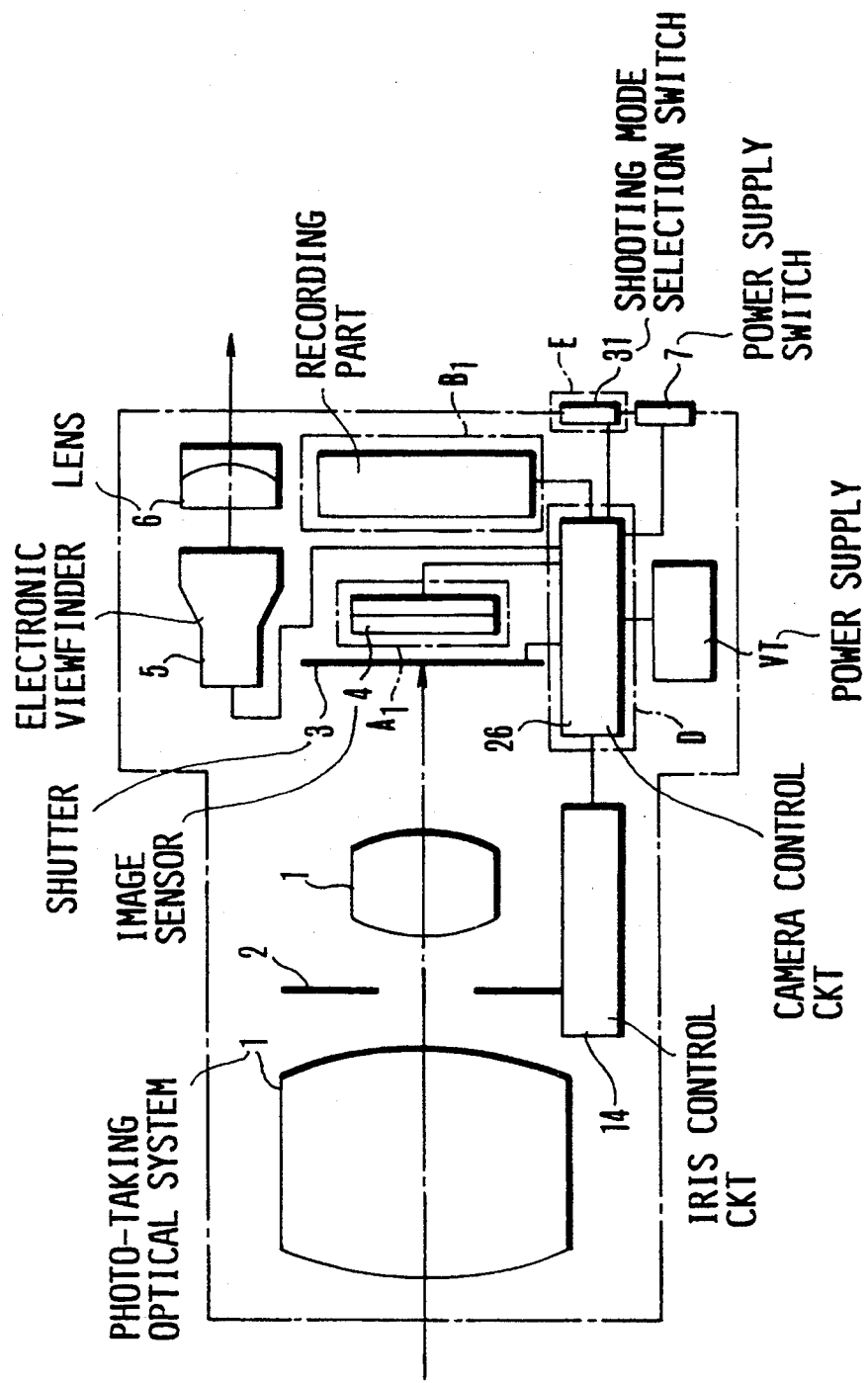
FIG. 8 is a schematic illustration of the arrangement of an electronic still camera arranged as a fourth embodiment of the invention.
Figure 9A:
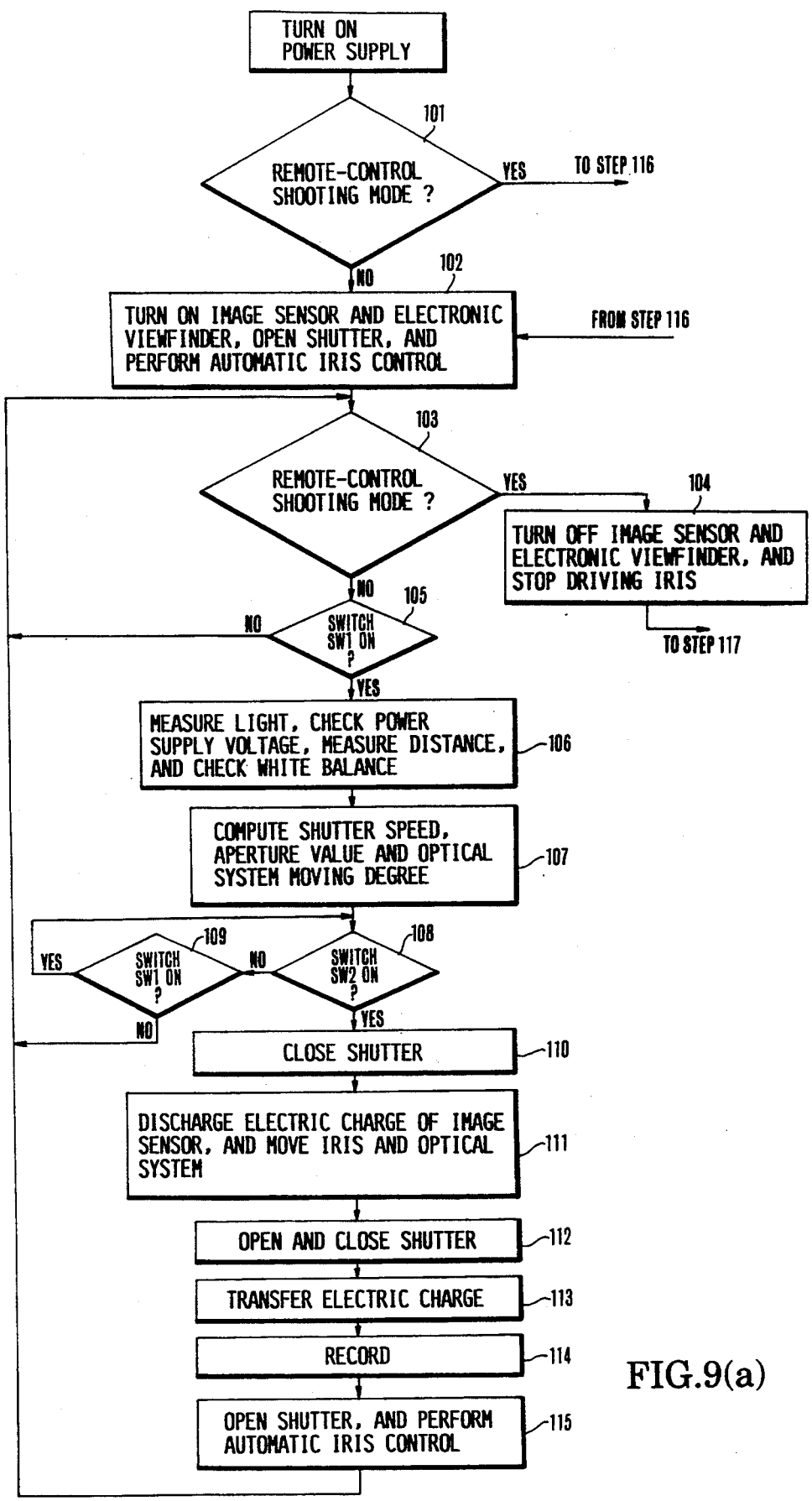
FIGS. 9(a) and 9(b) are flow charts showing the flow of control over the operation of the fourth embodiment.
Figure 9B:
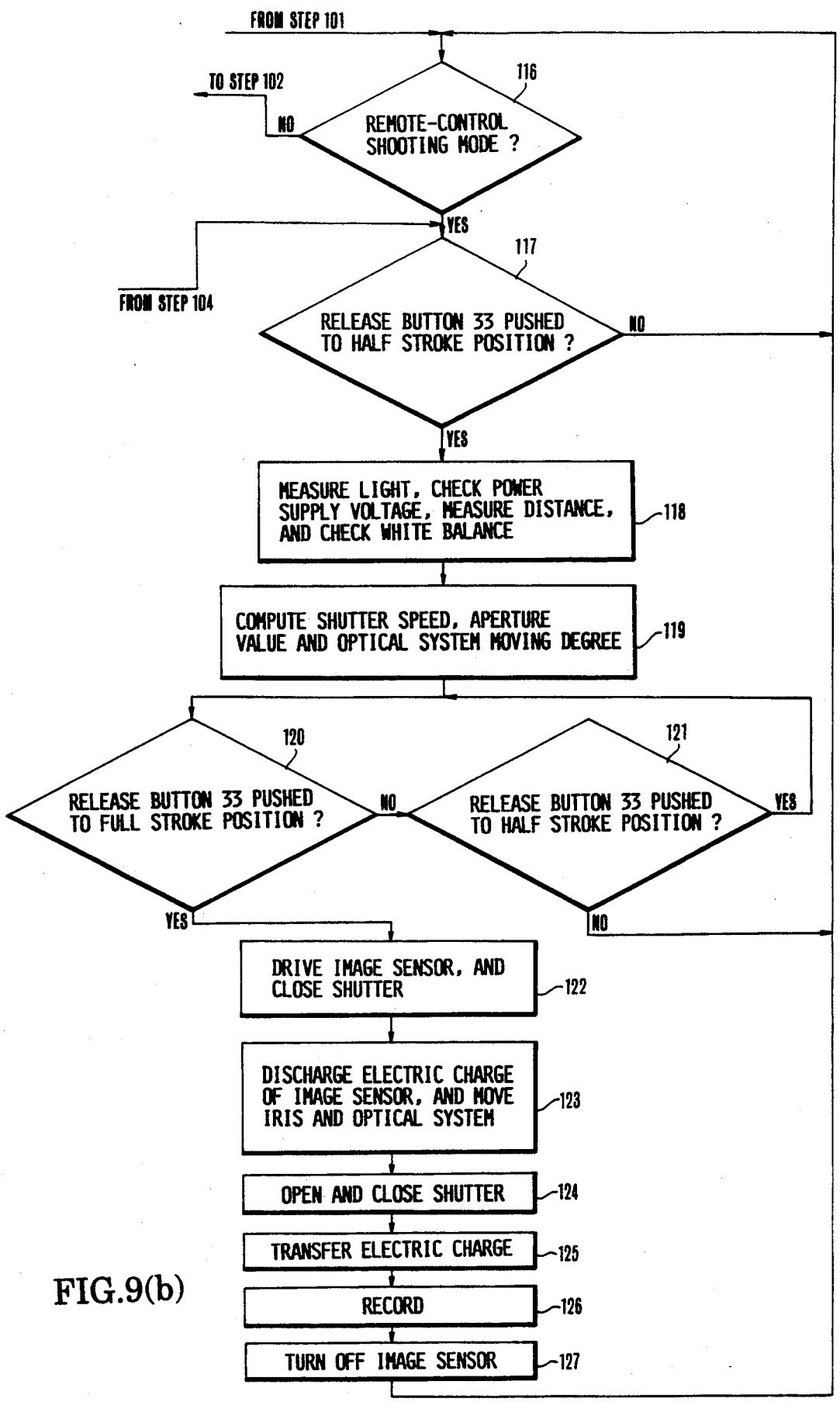
Figure 10A:
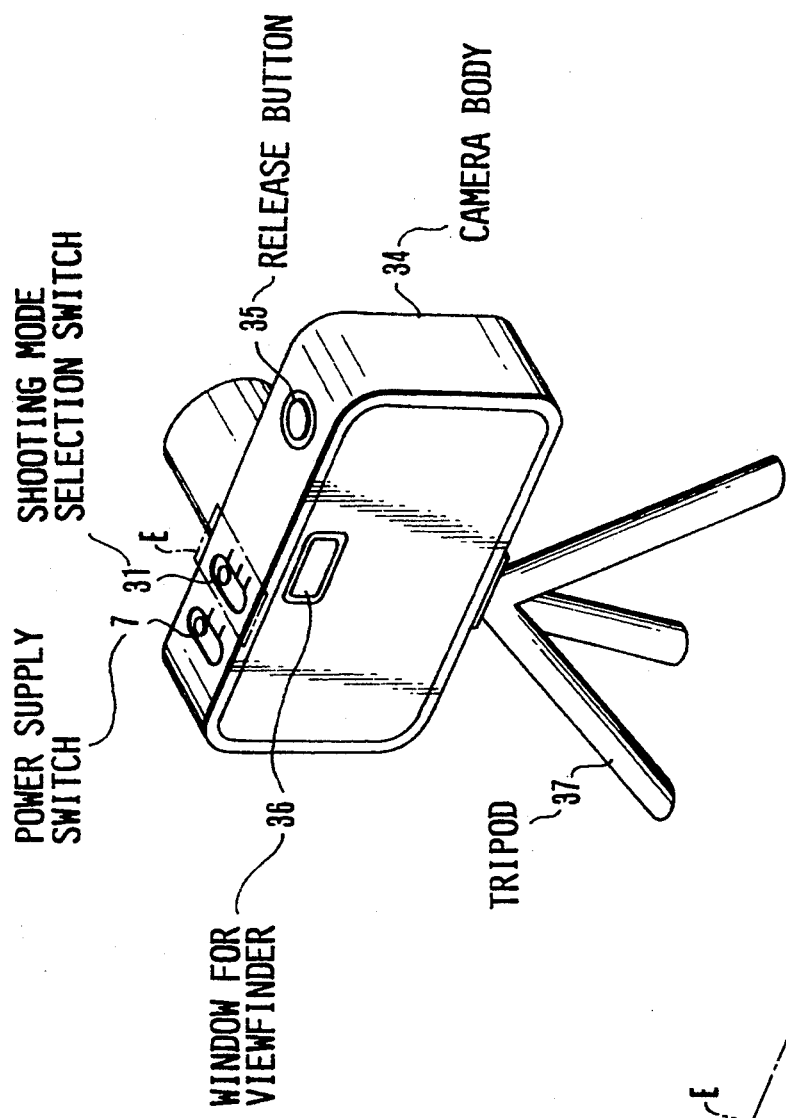
FIGS. 10(a) and 10(b) are oblique views showing the electronic still camera as in a remote-control shooting mode, FIG. 10(a) showing the camera body and FIG.
Figure 10B:
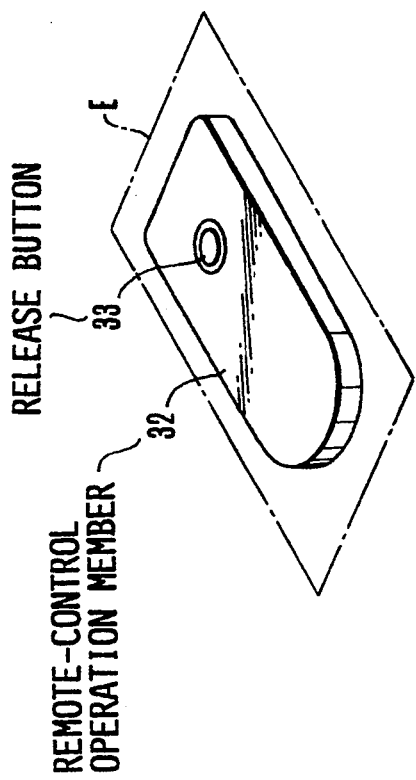

FIG. 8 shows in outline the arrangement of an electronic still camera which is arranged as a fourth embodiment of the invention. FIGS. 9(a) and 9(b) are flow charts showing the operation control flow of the embodiment. FIGS. 10(a) and 10(b) are oblique views showing the electronic still camera in a state of being operated by remote control. FIG. 10(a) shows the camera body and FIG. 10(b) shows a remote-control operation member. In FIGS. 8 to 10(b), the same component parts as those of FIGS. 1 to 7 are indicated by the same reference numerals.

Referring to FIG. 8, a reference symbol E denotes remote-control mode setting means. The remote-control mode setting means includes a shooting mode selection switch 31 and a remote-control operation member 32 (FIG. 10(b)). The electronic still camera (hereinafter referred to as camera) is arranged to be set into a remote-control shooting mode by the remote-control mode setting means, as will be described in detail later. Referring to FIGS. 10(a) and 10(b), these illustrations include a camera body 34; a shutter release button 35; a viewfinder window 36; a tripod 37; a remote-control operation member 32; and a shutter release button 33 provided on the member 32.

The remote-control shooting operation is performed as described below with the normal shooting described in part along with the remote-control shooting:

Like in the case of the normal shooting, the operator determines a picture composition for the remote-control shooting. The camera is fixedly set. After that, the shooting mode selection switch 31 is operated to select the remote-control shooting mode. In this instance, the driving-suspending and displaying-off control means operates to turn off the electronic viewfinder and to suspend the driving action on the image sensor except when the release button 33 of the remote-control operation member 32 is pushed for shooting and recording. With the camera in the remote-control shooting mode, when the release button 33 of the remote-control operation member 32 is pushed and the release button 33 comes to the half stroke position thereof, the remote-control operation member 32 sends to the camera body 34 a signal indicative of this in a known manner. When this signal is sensed on the side of the camera body 34, the image sensor 4 is driven. The luminance of the object to be recorded is measured by a light measuring unit which is not shown. When the release button 33 is further pushed till it comes to the full stroke position thereof, a signal indicating the full stroke pushing operation on the release button 33 is likewise sent to the camera body 34. Upon sensing this signal by the control circuit of the camera body 34, a shooting process begins. At first, the position of the iris 2 is adjusted to an aperture value which is either set according to the luminance of the object or set beforehand by the photographer. At the same time, the shutter 3 is closed to discharge the electric charge accumulated by the image sensor 4. Then, the shutter 3 is operated and a video signal stored at the image sensor 4 up to this point of time is transferred by the camera control circuit 26 to the recording part B1. The video signal is recorded by the recording part control circuit 24 on an unrecorded part of the recording medium. The shooting operation then comes to an end. If the shooting mode is shifted under this condition to the normal shooting mode by shifting the position of the shooting mode selection switch 31, the image sensor 4 is driven and the viewfinder 5 is turned on to display an image sensed by the image sensor 4.

The flow of control over the operation of the fourth embodiment is briefly described below with reference to the flow charts of FIGS. 9(a) and 9(b) with emphasis placed on the displaying-off control means:

Referring to FIGS. 9(a) and 9(b), the flow of control procedures begins when the power supply is switched on. At a step 101: The shooting mode of the camera is checked to find if it is the remote-control shooting mode. If not, the flow proceeds to a step 102. If so, the flow comes to a step 116. At the step 102: The image sensor and the electronic viewfinder are turned on. The shutter is opened. An automatic iris control action is performed. The flow comes to a step 103. At the step 103: Again, a check is made to see if the camera is in the remote-control shooting mode. If not, the flow comes to a step 105. If so, the flow proceeds to a step 104. At the step 105: A check is made to see if the release switch (hereinafter referred to as switch) SW1 is on. If so, the flow comes to a step 106. If not, the flow comes back to the step 103. At the step 106: The luminance of the object and a distance to the object are measured. The power supply voltage and the white balance are checked. At a step 107: A computing operation is performed for a shutter speed, an aperture value and the degree to which the position of the optical system is to be moved. The flow proceeds to a step 108. At the step 108: A check is made to see if the switch SW2 is on. If so, the flow comes to a step 110. At the step 110: The shutter is closed. At a step 111: The electric charge of the image sensor is discharged. The position of the iris and that of the optical system are moved. Step 112: The shutter is opened and closed. At a step 113: The electric charge is transferred. At a step 114: Recording is performed. At a step 115: The shutter is opened. The automatic iris control action is performed. The flow then comes back to the step 103. Further, with the camera found to be in the remote-control shooting mode at the step 101, the flow branches off from the step 101 to the step 116 as mentioned above. At the step 116: A check is made to see if the camera is in the remote-control shooting mode. If so, the flow proceeds to a step 117. If not, the flow comes back to the step 102. At the step 117: A check is made to see if the release button 33 is pushed to its half-stroke position. If so, the flow proceeds to a step 118. If not, the flow comes back to the step 116. At the step 118: The luminance and distance of the object are measured. The power supply voltage and white balance are checked. At a step 119: A computing operation is performed for a shutter speed, an aperture value and the degree to which the position of the optical system is to be moved. The flow then comes to a step 120. At the step 120: A check is made to see if the release button 33 is pushed to its full-stroke position. If so, the flow comes to a step 122. If not, the flow comes to a step 121. At the step 121: A check is made to see if the release button 33 is pushed to its half-stroke position. If so, the flow comes back to the step 120. If not, the flow comes back to the step 116.

At the step 122: The image sensor is driven. The shutter is closed. At a step 123: The electric charge of the image sensor is discharged. The position of the iris and that of the optical system are moved. At a step 124: The shutter is opened and closed. At a step 125: The electric charge is transferred. At a step 126: Recording is performed. At a step 127: The image sensor is turned off. The flow then comes back to the step 116. Further, at the step 104, the image sensor and the electronic viewfinder are turned off before the flow comes to the step 117.

Next, a fifth embodiment is described below with reference to FIGS. 11, 12, 13(a) and 13(b):

FIG. 11 shows in outline the arrangement of an electronic still camera which is arranged according to this invention as the fifth embodiment thereof. FIG. 12 shows the circuit arrangement of the fifth embodiment. FIGS. 13(a) and 13(b) are flow charts showing the operation control flow of the fifth embodiment. In FIG. 11, the component parts which are the same as or equivalent to those of FIGS. 1 to 10(b) are indicated by the same reference numerals. A remote-control operation member 38 is arranged to be attachable to and detachable from the camera body. A release button 39 is disposed at the remote-control operation member 38. An engagement confirmation unit 40 is provided on the camera body for confirming that the remote-control operation member 38 is engaged with the camera body. The unit 40 and a remote-control operation member engaging state confirming circuit 60 (FIG. 12) jointly form engagement confirming means G for confirming that the remote-control operation member 38 is detached to or removed from the camera body.

The fifth embodiment operates as described below with reference to FIGS. 11, 12, 13(a) and 13(b):

The operation of the fifth embodiment is similar to that of the fourth embodiment described in the foregoing in a case where the remote-control operation member 38 is attached to the camera body. However, the operation under that condition is once again described here. Referring to FIG. 11, when the power supply is turned on with the switch 7 operated, an image formed at the image sensor 4 is displayed on the electronic viewfinder 5. At this moment, the shutter 3 is open. Further, the iris 2 is opened or closed according to the amount of electric charge accumulated at the image sensor 4, i.e., according to the quantity of light incident on the image sensor 4. The quantity of incident light is thus adjusted by means of the iris 2. With a picture composed by the photographer through the electronic viewfinder 5, the release button 35 which is shown in FIG. 10(a) is pushed for shooting. When the release button 35 is pushed to its half-stroke position, the switch SW1 (FIG. 12) is turned on. This causes the image sensor 4 to be driven. The luminance of an object to be shot is then measured by a light measuring unit which is not shown. When the release button 35 is further pushed to reach to its full-stroke position, the switch SW2 (FIG. 12) is turned on. The on-state of the switch SW2 is confirmed by the camera control circuit 26. This causes the process of shooting to begin. First, the position of the iris 2 is moved to an aperture position corresponding to an aperture value which is either determined by the luminance of the object or predetermined by the photographer. At the same time, the shutter 3 is closed. The electric charge accumulated at the image sensor 4 is discharged. The shutter is opened and closed. Then, a video signal accumulated and formed at the image sensor 4 is transferred by the camera control circuit 26 to the recording part B1. The video signal is recorded by the recording part control circuit 24 on an unrecorded part of a recording medium. The shutter is brought back to its state obtained before it is released, and the shooting process comes to an end.

In a case where none of camera operation members such as the release button 35 are operated over a certain period of time, a power supply to the electronic viewfinder 5 is turned off to prevent the electric energy of the power source from being wasted. However, when any of the camera operation members comes to be operated under this condition, the electronic viewfinder 5 is again turned on to bring it back to its previous state.

While the normal operation of the fifth embodiment is as described above, its operation in the remote-control shooting mode is as follows:

In the remote-control shooting mode, the camera is fixed in position after a picture is composed by the photographer like in the normal shooting. After that, the remote-control operation member 38 is detached from the camera. The detachment of the remote-control operation member 38 is confirmed by the engagement confirmation unit 40. The camera is then set into the remote-control shooting mode. The electronic viewfinder 5 is then turned off and the image sensor 4 ceases to be driven until shooting and recording are performed by pushing the release button 39 (which corresponds to the release button 33 of FIG. 10(b)) of the remote-control operation member 38 (which corresponds to the member 32 of FIG. 10(b)). While the camera is in the remote-control shooting mode, when the release button 39 is pushed and comes to its half-stroke position, the remote-control operation member 38 sends, in a known manner, a signal to the camera body indicating that the release button 39 is pushed to the half-stroke position. When this signal is sensed by the camera body, the image sensor 4 is driven. Then, the luminance of the object is measured by the light measuring unit (not shown). With the release button further pushed, when it reaches its full-stroke position, the remote-control operation member 38 likewise sends another signal to the camera body indicating that the release button 39 has reached its full-stroke position. With that signal sensed by the control circuit of the camera body, the process of shooting begins. The ensuing part of the operation is similar to the normal shooting. However, it is further described as follows:

In the first place, the iris 2 is moved to its position of either an aperture value determined according to the luminance of the object or an aperture value preset by the photographer. At the same time, the shutter 3 is closed. A video signal accumulated at the image sensor 4 is transferred by the camera control circuit 26 to the recording part B1. The recording part control circuit 24 then records the video signal on an unrecorded part of the recording medium, and the process of shooting comes to an end. Further, under this condition, when the remote-control operation member 38 is attached again to a given part of the camera body and when this is confirmed by the engagement confirmation unit 40, the camera comes back to the normal shooting mode. Then, the electronic viewfinder 5 is turned on to display an image obtained by the image sensor 4.

Next, the operation of the fifth embodiment is controlled as described below with reference to FIGS. 13(a) and 13(b) which are flow charts:

The flow charts of FIGS. 13(a) and 13(b) differ from those of FIGS. 9(a) and 9(b) in that: The steps 101, 103 and 116 of FIGS. 9(a) and 9(b) are replaced with the steps 101A, 103A and 116A of FIGS. 13(a) and 13(b) respectively. More specifically, the words "remote-control shooting mode? " of FIGS. 9(a) and 9(b) are changed to "remote control operation member detached from camera? " in the flow charts of FIGS. 13(a) and 13(b). Since both the fourth and fifth embodiments are described as being set in the remote-control shooting mode, the operation control steps of the fifth embodiment are executed in the same manner as in the case of the fourth embodiment with the exception of the above-stated change in wording. Therefore, the operation control procedures of the fifth embodiment which are the same as those of the fourth embodiment are omitted from the description given here. Further, the release button 39 mentioned at the steps 117A, 120A and 121A of FIG. 13(b) corresponds to and is equivalent to the release button 33 mentioned at the steps 117, 120 and 121 of FIG. 9(b) as mentioned in the foregoing.

The fourth and fifth embodiments described above are arranged to suspend the driving action on the image sensing means and to turn off the electronic viewfinder while the camera is in the remote-control shooting mode except when shooting and recording are to be performed in this mode. This arrangement effectively prevents the power source of the camera from being unnecessarily consumed.

What is claimed is:

1. A system comprising:
a main body having power supply means and an accessory member detachably mounted on said main body, said main body comprising at least one function unit therewith powered by said power supply means, control means for controlling power supply from said power supply means to said function unit and detection means for detecting detachment of said accessory member from said main body, said control means supplying power from said power supply means to said function unit when said accessory member is attached on said main body and discontinuing the supply of power from said power supply means to said function unit when the detachment of said accessory member from said main body is detected by said detection means.

2. A system according to claim 1, wherein said main body comprises a camera body.

3. A system according to claim 1, wherein said accessory member comprises a photo-taking optical system.

4. A system according to claim 1, wherein said function unit comprises an electronic viewfinder.

5. A system according to claim 1, wherein said detection means comprises a direct contact provided between said main body and said accessory member.

* * * * *